US012532111B2

(12) United States Patent
Hajdu et al.

(10) Patent No.: US 12,532,111 B2
(45) Date of Patent: Jan. 20, 2026

(54) MICROPHONE ARRANGEMENT

(71) Applicant: Harman Becker Automotive Systems GmbH, Karlsbad (DE)

(72) Inventors: Daniel Hajdu, Budapest (HU); Szabolcs Levente Ditroi-Toth, Budapest (HU); Viktor Dobos, Kecskemét (HU); Florian Czinege, Budapest (HU)

(73) Assignee: Harman Becker Automotive Systems GmbH, Karlsbad (DE)

( * ) Notice: Subject to any disclaimer, the term of this patent is extended or adjusted under 35 U.S.C. 154(b) by 260 days.

(21) Appl. No.: 18/299,518

(22) Filed: Apr. 12, 2023

(65) Prior Publication Data

US 2023/0336914 A1 Oct. 19, 2023

(30) Foreign Application Priority Data

Apr. 14, 2022 (EP) .................................... 22168373

(51) Int. Cl.

*H04R 3/04* (2006.01)
*H04R 1/40* (2006.01)
*H04R 3/00* (2006.01)

(52) U.S. Cl.

CPC ............... *H04R 3/04* (2013.01); *H04R 1/406* (2013.01); *H04R 3/005* (2013.01)

(58) Field of Classification Search

CPC . H04R 3/00; H04R 3/04; H04R 3/005; H04R 1/406; H04R 2430/23
USPC ............................... 381/74, 91, 92, 122, 313
See application file for complete search history.

(56) References Cited

U.S. PATENT DOCUMENTS

| | | | | |
|---|---|---|---|---|
| 5,640,142 | A * | 6/1997 | Matatall, Jr. ........... | G08B 13/04 340/541 |
| 2015/0213797 | A1* | 7/2015 | Wang ...................... | G10L 17/00 381/77 |
| 2019/0387311 | A1 | 12/2019 | Schultz | |
| 2020/0120418 | A1 | 4/2020 | Enstad et al. | |
| 2020/0275199 | A1* | 8/2020 | Enstad ..................... | H04R 3/04 |
| 2021/0219072 | A1* | 7/2021 | Zhang ..................... | G10K 11/178 |

* cited by examiner

*Primary Examiner* — William A Jerez Lora
(74) *Attorney, Agent, or Firm* — Angela M. Brunetti

(57) ABSTRACT

A microphone arrangement comprises a microphone array comprising at least two microphones, each of the at least two microphones providing a microphone output signal, a first adder, configured to provide a microphone array output signal by summing delayed versions of the microphone output signals of each of the at least two microphones, a first filter unit, configured to provide a filtered microphone array output signal, a second filter unit configured to provide a filtered microphone output signal of one of the at least two microphones, and a second adder, configured to provide an output microphone signal by summing the filtered microphone array output signal and the filtered microphone output signal.

10 Claims, 3 Drawing Sheets

FIG. 1
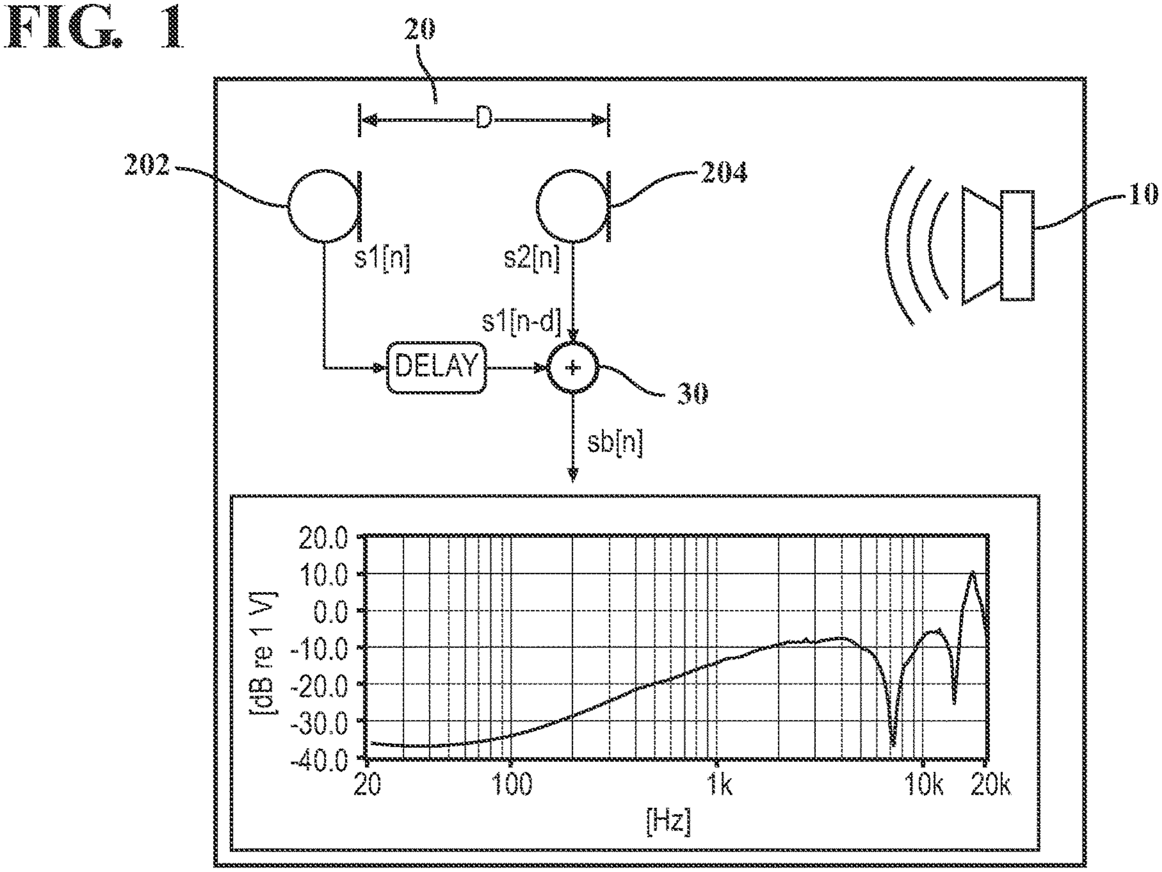
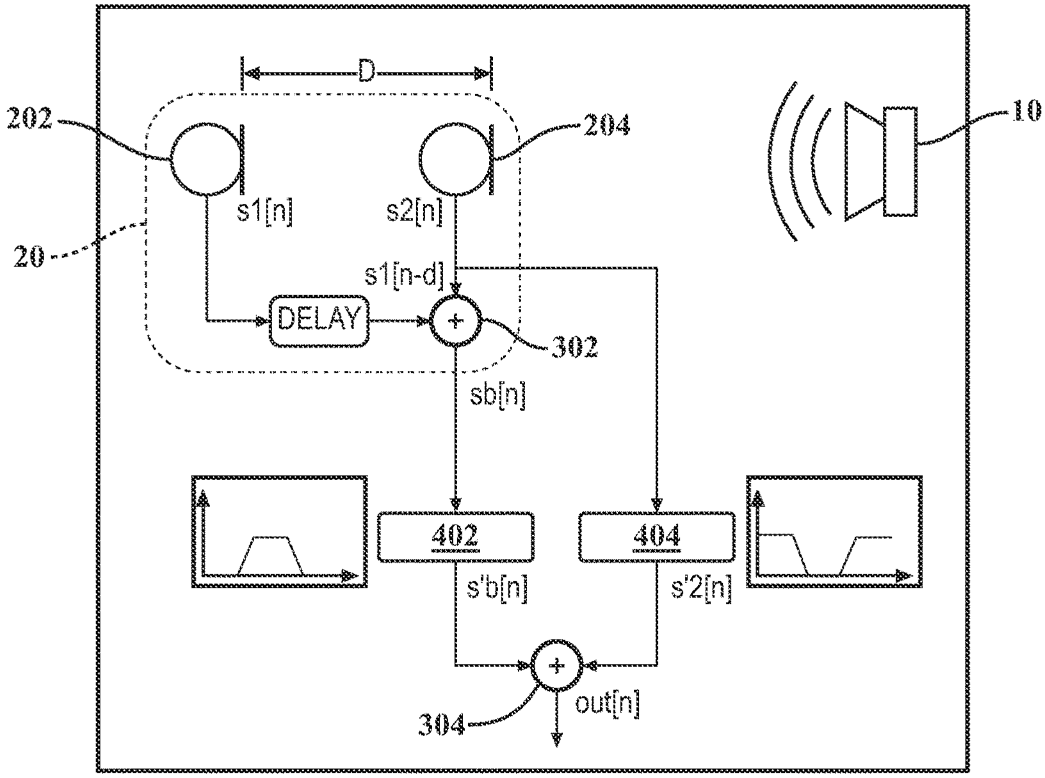
FIG. 2

MICROPHONE ARRANGEMENT

CROSS REFERENCE

Priority is claimed to application serial no. 22168373.3, filed Apr. 14, 2022 in Europe, the disclosure of which is incorporated in its entirety by reference.

TECHNICAL FIELD

The disclosure relates to a microphone arrangement, in particular to a microphone arrangement comprising a plurality of microphones.

BACKGROUND

For many applications, microphones are required to provide a flat frequency response across a wide frequency range. Automatic speech recognition applications, for example, often require a flat frequency response across a frequency range of between at least 80 Hz to 16 kHz. Uni-directional microphones, as compared to omnidirectional microphones, provide an increased signal-to-noise ratio by having a lower sensitivity in all directions except a main direction (e.g., a front facing direction). Directionality of a microphone arrangement can be achieved by arranging a plurality of microphones in a microphone array (beamforming array). While having several advantages as compared to omnidirectional microphones, such beamforming microphone arrays, however, generally do not have a flat frequency response and therefore cannot be used in applications requiring both a beamforming capability as well as a flat frequency response across a wide frequency range.

SUMMARY

A microphone arrangement includes a microphone array including at least two microphones, each of the at least two microphones providing a microphone output signal, a first adder, configured to provide a microphone array output signal by summing delayed versions of the microphone output signals of each of the at least two microphones, a first filter unit, configured to provide a filtered microphone array output signal, a second filter unit configured to provide a filtered microphone output signal of one of the at least two microphones, and a second adder, configured to provide an output microphone signal by summing the filtered microphone array output signal and the filtered microphone output signal.

A method for operating a microphone arrangement includes providing at least two microphone output signals by means of at least two microphones of a microphone array, providing a microphone array output signal by summing delayed versions of the microphone output signals of each of the at least two microphones by means of a first adder, providing a filtered microphone array output signal by means of a first filter unit, providing a filtered microphone output signal of one of the at least two microphones by means of a second filter unit, and providing an output microphone signal by summing the filtered microphone array output signal and the filtered microphone output signal by means of a second adder.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

FIG. 1 schematically illustrates a first order differential endfire beamforming microphone array;

FIG. 2 schematically illustrates a microphone arrangement according to one example;

DETAILED DESCRIPTION

Figure 3:
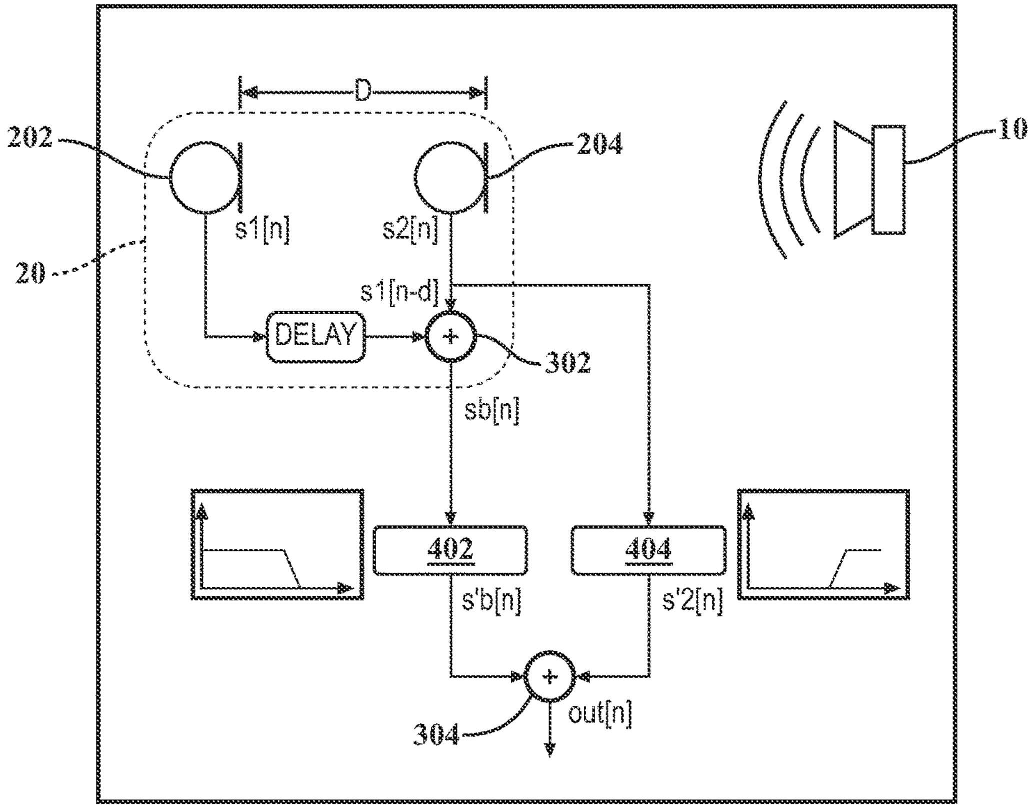
FIG. 3 schematically illustrates a microphone arrangement according to another example.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

Microphones are often desired to have a flat frequency response over a wide frequency range of, e.g., 20 Hz to 16 or even 20 kHz. The frequency response of a microphone or microphone arrangement is usually defined as a quantitative measure of the magnitude of the output signal as a function of input frequency. In conventional microphone arrangements, the frequency response may comprise variations of 50 dB or even more over the entire frequency range. A frequency response may be considered flat if variations over the entire frequency range are less than 10 dB, or even less than 5 dB. Flat frequency responses are often required for, e.g., automatic speech recognition applications.

Uni-directional (directional) microphones provide an increased signal-to-noise ratio by having a lower sensitivity in all but the main (i.e., front-facing) direction. First-order differential endfire arrays provide a simple way of achieving directionality. The principle behind this beamforming technique is to simply sum the signal from the front element with the delayed and inverted rear element. This is schematically illustrated in FIG. 1. FIG. 1 schematically illustrates a microphone array 20 comprising a first microphone 202 and a second microphone 204. Each of the first microphone 202 and the second microphone 204 may be an (analog) omnidirectional microphone, wherein an omnidirectional microphone is a microphone that picks up sound with equal gain from all sides or directions. The first microphone 202 and the second microphone 204 pick up sound from a sound source 10. The sound source 10 may be a person or a loudspeaker, for example. Any other sound sources, however, are also possible. The first microphone 202 and the second microphone 204 are arranged at a distance D from each other. The first microphone 202 provides a first microphone output signal s1[n], and the second microphone 204 provides a second microphone output signal s2[n]. The microphone array 20 is a (uni-) directional microphone array. That is, the microphone array 20 picks up sound with a high gain from only one specific direction (e.g., the direction of the sound source 10).

Directionally, however, a first-order differential endfire array can create cardioid, hypercardioid, or supercardioid patterns. In order to achieve a cardioid pattern, for example, the time that is needed for the sound waves to travel between two microphone elements is roughly the same as a beamformer delay. In FIG. 1, the delay is schematically illustrated, resulting in a delayed microphone signal s1[n-d1] of the first microphone 202, which is arranged further away from the sound source 10 than the second microphone 204. As the second microphone 204 is arranged closer to the sound source 10, sound originating from the sound source 10 reaches the second microphone 204 earlier than the first microphone 202. The (delayed) microphone output signal s2[n-d2] of the second microphone 204 and the (delayed) microphone output signal s1[n-d1] of the first microphone 202 are added by means of an adder 30, resulting in a microphone array output signal sb[n]=s2[n]−s1[n-d]. The delay may also be zero, e.g., for the microphone of the microphone array 20 which is arranged closest to the sound source 10. In the examples illustrated herein this results in s2[n-d2]=s2[n-0]=s2[n].

Differential endfire microphone arrays, however, may have several drawbacks. For example, differential endfire microphone arrays do not have a flat frequency response. A differential endfire microphone generally has a high-pass filter's response characteristic up to a first cancellation frequency, rising with frequencies of 6 dB/octave. On the high-frequency end, a comb filtering effect occurs because of the periodically occurring frequency cancellation. The frequency response of a typical first order (two-microphone) differential endfire beamforming microphone array is schematically illustrated in FIG. 1 (bottom). Some systems can calculate cancelled frequencies from the total effective delay between channels, which comprise the beamformer's delay and the delay stemming from the elements' distance difference relative to the sound source 10 (i.e., maximal at 0°, minimal at 180°, and zero at 90° and 270°).

Positional delay is generally proportional to the distance D between the array's microphone elements 202, 204. Therefore, the beamformer's physical dimensions limit the 'useful' frequency range between the 6 dB/octave slope and the first cancellation point. Using equalization on the output to flatten the response considerably raises noise levels at both low and high frequencies. For a hands-free microphone application, the 6 dB/octave rise at low frequencies might be acceptable but the high-frequency cancellation points are generally not.

In the following, examples of a hybrid analog beamforming microphone array are described that has a superwide band frequency response. To achieve this, the system sums the beamformer's mid-frequency output and the low- and high-frequency parts of one of the beamformer's microphone elements. The system performs separation of these three frequency bands using filters such as a mid-frequency bandpass filter for the beamformer and lowpass and highpass for the low and high-frequency portions of the single microphone element. This counteracts the low- and high-frequency sensitivity drops in the beamformer's frequency response. For handsfree (e.g., speech application) microphones, it may be even sufficient to treat only the high frequencies by providing only a lowpass filter for the beamformer and a highpass for the single element. This will be described in more detail with respect to FIGS. 2 (general case) and 3 (handsfree application) below.

Now referring to FIG. 2, a microphone arrangement according to one example comprises a microphone array 20 comprising at least two microphones 202, 204, each of the at least two microphones 202, 204 providing a microphone output signal s1[n], s2[n], each of the microphone output signals s1[n], s2[n] comprising a low frequency range, a mid-frequency range, and a high frequency range component. The microphone arrangement further comprises a first adder 302, configured to provide a microphone array output signal sb[n]=s2[n]−s1[n-d1] by summing a delayed version s1[n-d1], s2[n] of the microphone output signals s1[n], s2[n] of each of the at least two microphones 202, 204, the microphone array output signal sb[n] comprising a low frequency range, a mid-frequency range, and a high frequency range component. In the example illustrated in FIG. 2, a delayed version s1[n-d1] of the microphone output signal s1[n] is added to the microphone output signal s2[n] (delay=0) of the second microphone 204. The microphone arrangement further comprises a first filter unit 402, configured to provide a filtered microphone array output signal s'b[n], and a second filter unit 404 configured to provide a filtered microphone output signal s'2[n] of one of the at least two microphones 202, 204. In the example illustrated in FIG. 2, the microphone output signal s2[n] of the second microphone 204 is filtered by the second filter unit 404. A second adder 304 is configured to provide an output microphone signal out[n] by summing the filtered microphone array output signal s'b[n] and the filtered microphone output signal s'2[n].

In the example illustrated in FIG. 2, the first filter unit 402 comprises a bandpass filter that is configured to remove the low frequency range and the high frequency range components from the microphone array output signal sb[n] such that the filtered microphone array output signal s'b[n] only comprises the mid-frequency range components of the microphone array output signal sb[n]. The second filter unit 404 in this example comprises a lowpass filter configured to remove the mid-frequency and high frequency components, and a highpass filter configured to remove the low frequency and mid-frequency range components from the microphone output signal s2[n]. By combining the resulting signals appropriately, the resulting filtered microphone output signal s'2[n] only comprises the low frequency range and high frequency range components of the microphone output signal s2[n]. The resulting output microphone signal out[n] that is generated by summing the filtered microphone array output signal s'b[n] and the filtered microphone output signal s'2[n] therefore comprises the mid-frequency component of the microphone array output signal sb[n] of the uni-directional microphone array 20, and the low and high frequency components of the microphone output signal s2[n] of the single omnidirectional microphone 204.

Figure 4:
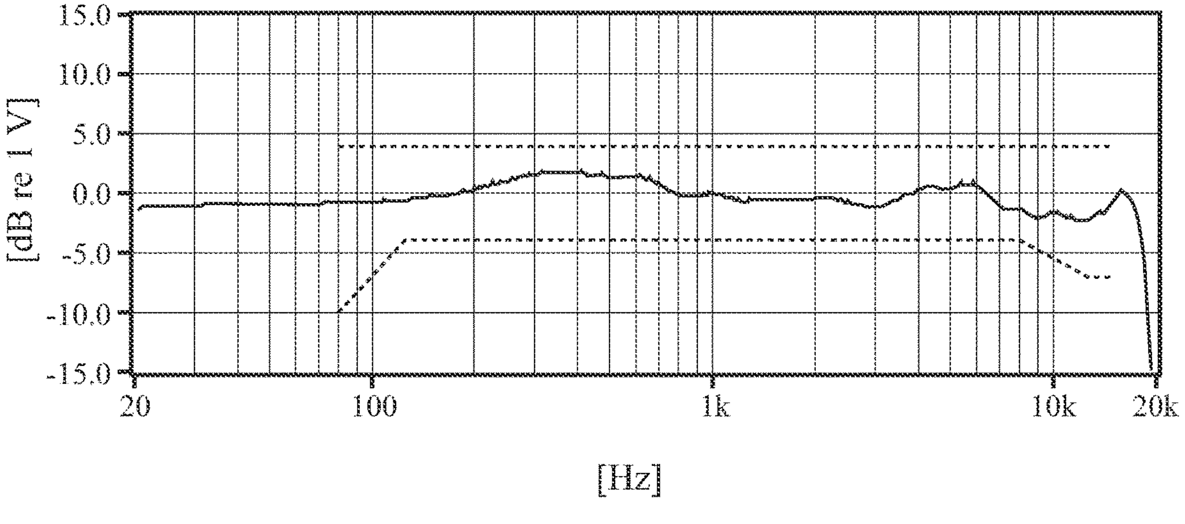
FIG. 4 schematically illustrates a frequency response of the microphone arrangement of FIG. 2.

The resulting frequency response is flat, as is schematically illustrated in FIG. 4. As can be seen, the frequency response remains between −4 dB and +4 dB for all frequencies between 20 Hz and about 16 kHz (FIG. 4 contains limits from ITU standard T.1120 'superwideband').

The microphone arrangement that is exemplarily illustrated in FIG. 3 essentially corresponds to the microphone arrangement of FIG. 2. However, in this example the first filter unit 402 comprises a lowpass filter that is configured to remove the high frequency range component from the microphone array output signal sb[n] such that the filtered microphone array output signal s'b[n] comprises the low frequency and mid-frequency range components of the microphone array output signal sb[n]. The second filter unit 404 in this example comprises a highpass filter that is configured to remove the low frequency and mid-frequency range components from the microphone output signal s2[n] such that the filtered microphone output signal s'2[n] only comprises the high frequency range component of the microphone output signal s2[n]. The resulting output microphone signal out[n] that is generated by summing the filtered microphone array output signal s'b[n] and the filtered microphone output signal s'2[n] therefore comprises the low frequency and mid-frequency components of the microphone array output signal sb[n] of the uni-directional microphone array 20, and the high frequency component of the microphone output signal s2[n] of the single omnidirectional microphone 204. The resulting frequency response (not specifically illustrated) is flat at mid- and high frequencies, moderately falling below approximately 100-200 Hz, resulting in a frequency response that is usually considered adequate for handsfree microphones.

In the examples described above, the microphone array 20 comprises two microphones 202, 204. This, however, is only an example. The same principles may also be applied for microphone arrays comprising more than two microphones 202, 204, . . . , 20*x*. In any case, the microphone array output signal sb[n] is obtained by summing delayed versions s1[n-d1], s2[n-d2], . . . , sx[n-dx] (delay may be zero for one of the microphones) of the microphone output signals s1[n], s2[n], . . . , sx[n] of each of the at least two microphones 202, 204, . . . , 20*x* of the microphone array. The microphone output signal sx[n] of only one of the at least two microphones 202, 204, . . . , 20*x* is filtered in the way as described above and then added to the filtered microphone array output signal s'b[n]. However, the omnidirectional microphone 20*x* providing the microphone output signal sx[n] that is provided to the second filter unit 404 is always included in the uni-directional microphone array 20. That is, the same microphone output signal sx[n] is provided to the second filter unit 404 and to the first adder 302. A single element of a microphone array is therefore used to compensate for the whole microphone array's output frequency response. The resulting frequency response is generally flat. This applies for microphone arrays 20 comprising two microphones as well as for microphone arrays 20 comprising more than two microphones 202, 204, . . . 20*x*.

The frequency response of a conventional uni-directional microphone array 20 generally has low and high frequency sensitivity drops, as has been described with respect to FIG. 1 above. With the exemplary microphone arrangements described herein, it is possible to counteract these low and high frequency sensitivity drops, resulting in a flat frequency response. For some applications, a microphone arrangement according to FIG. 2 may be beneficial. For other applications such as, e.g., hands-free microphone applications, it may be sufficient to treat only the high frequencies by using a lowpass filter for the beamforming microphone array signal, and a highpass filter for the single microphone output signal (see FIG. 3).

Summarizing the above, the exemplary microphone arrangements allow a directional microphone array to have a superwide band frequency characteristic without sacrificing sound-to-noise ratio by adding noise at low and high frequency bands.

The frequency responses as exemplarily illustrated in the figures and as described herein are merely examples. Generally, the course of the frequency response over the frequency range depends, among others, on the distance D between the microphones 202, 204 of the microphone array 20, and on the resulting delays. This is because the microphone array output signal sb[n] from a uni-directional microphone array 20 generally is not only a function of time but also a function of microphone direction.

For the microphone array output signal sb[n] and each of the delayed versions s1[n-d1], s2[n-d2] of the microphone output signals s1[n], s2[n] the following may apply: the low frequency component includes frequencies of below 400 to 800 Hz, the mid-frequency component includes frequencies of between 400 to 800 Hz and 4 to 8 kHz, and the high frequency component includes frequencies of more than 4 to 8 kHz.

Figure 5:
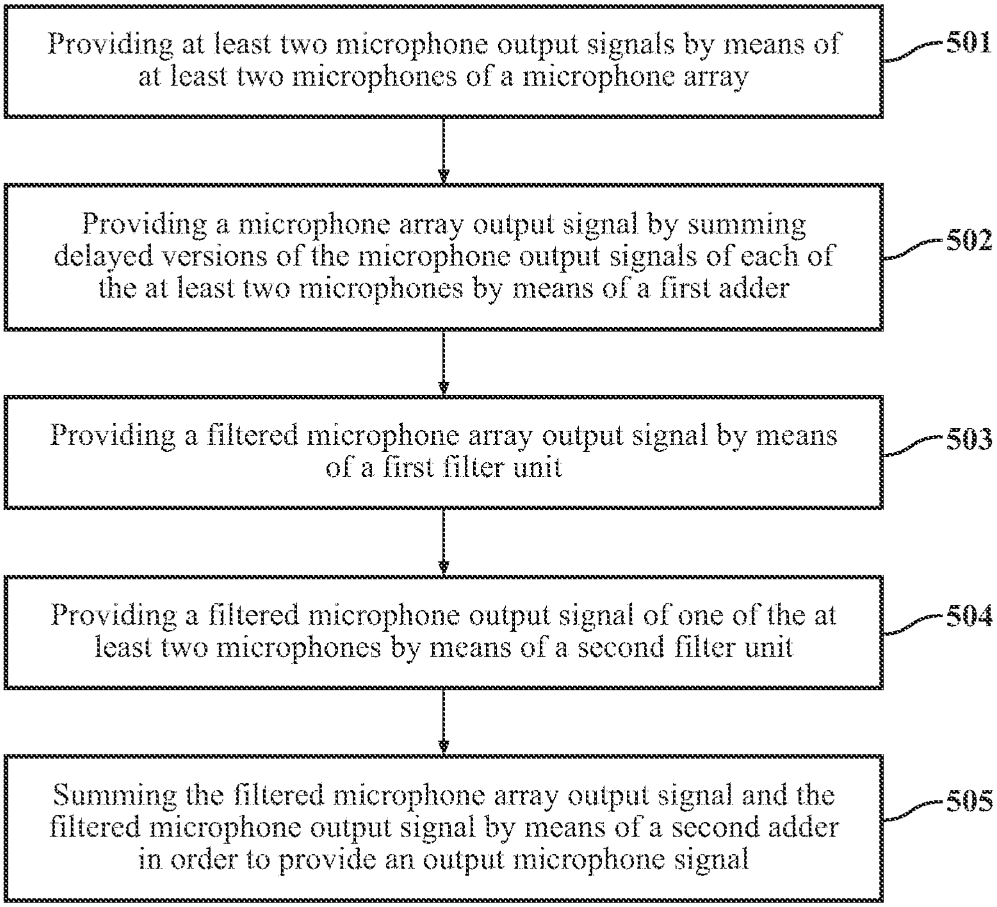
FIG. 5, in a flow chart, schematically illustrates a method for operating a microphone arrangement according to one example.

Now referring to FIG. 5, a method for operating a microphone arrangement is schematically illustrated. The method comprises providing at least two microphone output signals s1[n], s2[n] by means of at least two microphones 202, 204 of a microphone array 20 (step 501). The method further comprises providing a microphone array output signal sb[n] by summing delayed versions s1[n-d1], s2[n-d2] of the microphone output signals s1[n], s2[n] of each of the at least two microphones 202, 204 by means of a first adder 302 (step 502). A filtered microphone array output signal s'b[n] is provided by means of a first filter unit 402 (step 503), and a filtered microphone output signal s'2[n] of one of the at least two microphones 202, 204 is provided by means of a second filter unit 404 (step 504). The filtered microphone array output signal s'b[n] and the filtered microphone output signal s'2[n] are then summed by means of a second adder 304 in order to provide an output microphone signal out[n] (step 505).

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

The invention claimed is:

1. A microphone arrangement comprising:

a microphone array comprising at least two microphones, each of the at least two microphones providing a microphone output signal;

a first adder, configured to provide a microphone array output signal by summing delayed versions of the microphone output signals of each of the at least two microphones, wherein the microphone array output signal comprises a low frequency range, a mid-frequency range, and a high frequency range component, and each of the delayed versions of the microphone output signals comprises a low frequency range, a mid-frequency range, and a high frequency range component;

a first filter unit, configured to provide a filtered microphone array output signal, the first filter unit is configured to remove the low frequency range and the high frequency range components from the microphone array output signal such that the filtered microphone array output signal only comprises the mid-frequency range component of the microphone array output signal;

a second filter unit configured to provide a filtered microphone output signal of one of the at least two microphones, the second filter unit is configured to remove the mid-frequency range component from the microphone output signal such that the filtered microphone output signal only comprises the low frequency range and high frequency range components of the microphone output signal; and a second adder, configured to provide an output microphone signal by summing the filtered microphone array output signal and the filtered microphone output signal of one of the at least two microphones.

2. The microphone arrangement of claim 1, wherein the first filter unit comprises a bandpass filter, and the second filter unit comprises a lowpass filter and a highpass filter.

3. The microphone arrangement of claim 1, wherein each of the delayed versions of the microphone output signals comprises a low frequency range, a mid-frequency range, and a high frequency range component, and the microphone array output signal comprises a low frequency range, a mid-frequency range, and a high frequency range component, and wherein the first filter unit is configured to remove the high frequency range component from the microphone array output signal such that the filtered microphone array output signal only comprises the low frequency and mid-frequency range components of the microphone array output signal; and the second filter unit is configured to remove the low frequency and mid-frequency range components from the microphone output signal such that the filtered microphone output signal only comprises the high frequency range component of the microphone output signal.

4. The microphone array of claim 3, wherein the first filter unit comprises a lowpass filter, and the second filter unit comprises a highpass filter.

5. The microphone arrangement of claim 1, wherein the microphone array is a uni-directional microphone array.

6. The microphone arrangement of claim 1, wherein each of the at least two microphones is an omnidirectional microphone.

7. The microphone arrangement of claim 1, wherein for the microphone array output signal and each of the delayed versions of the microphone output signals, the following applies:

the low frequency component includes frequencies of below 400 to 800 Hz, the mid-frequency component includes frequencies of between 400 to 800 Hz and 4 to 8 kHz, and the high frequency component includes frequencies of more than 4 to 8 kHz.

8. The microphone arrangement of claim 3, wherein for the microphone array output signal and each of the delayed versions of the microphone output signals, the following applies:

the low frequency component includes frequencies of below 400 to 800 Hz, the mid-frequency component includes frequencies of between 400 to 800 Hz and 4 to 8 kHz, and the high frequency component includes frequencies of more than 4 to 8 kHz.

9. A method for operating a microphone arrangement, the method comprising:

providing at least two microphone output signals by means of at least two microphones of a microphone array;

providing a microphone array output signal by summing delayed versions of the microphone output signals of each of the at least two microphones by means of a first adder wherein the microphone array output signal comprises a low frequency range, a mid-frequency range, and a high frequency range component, and each of the delayed versions of the microphone output signals comprises a low frequency range, a mid-frequency range, and a high frequency range component;

providing a filtered microphone array output signal by means of a first filter unit configured to remove the low frequency range and the high frequency range components from the microphone array output signal such that the filtered microphone array output signal only comprises the mid-frequency range components of the microphone array output signal;

providing a filtered microphone output signal of one of the at least two microphones by means of a second filter unit configured to remove the mid-frequency range component from the microphone output signal such that the filtered microphone output signal only comprises the low frequency range and high frequency range components of the microphone output signal; and providing an output microphone signal by summing the filtered microphone array output signal and the filtered microphone output signal by means of a second adder.

10. The method of claim 9, wherein each of the delayed versions of the microphone output signals comprises a low frequency range, a mid-frequency range, and a high frequency range component, and the microphone array output signal comprises a low frequency range, a mid-frequency range, and a high frequency range component, and wherein providing a filtered microphone array output signal comprises removing the high frequency range component from the microphone array output signal such that the filtered microphone array output signal only comprises the low frequency and mid-frequency range components of the microphone array output signal; and providing a filtered microphone output signal comprises removing the low frequency and mid-frequency range components from the microphone output signal such that the filtered microphone output signal only comprises the high frequency range component of the microphone output signal.

* * * * *